Aug. 28, 1951     E. A. CALLISON     2,566,164
MOTORIZED LAWN MOWER
Filed May 28, 1948
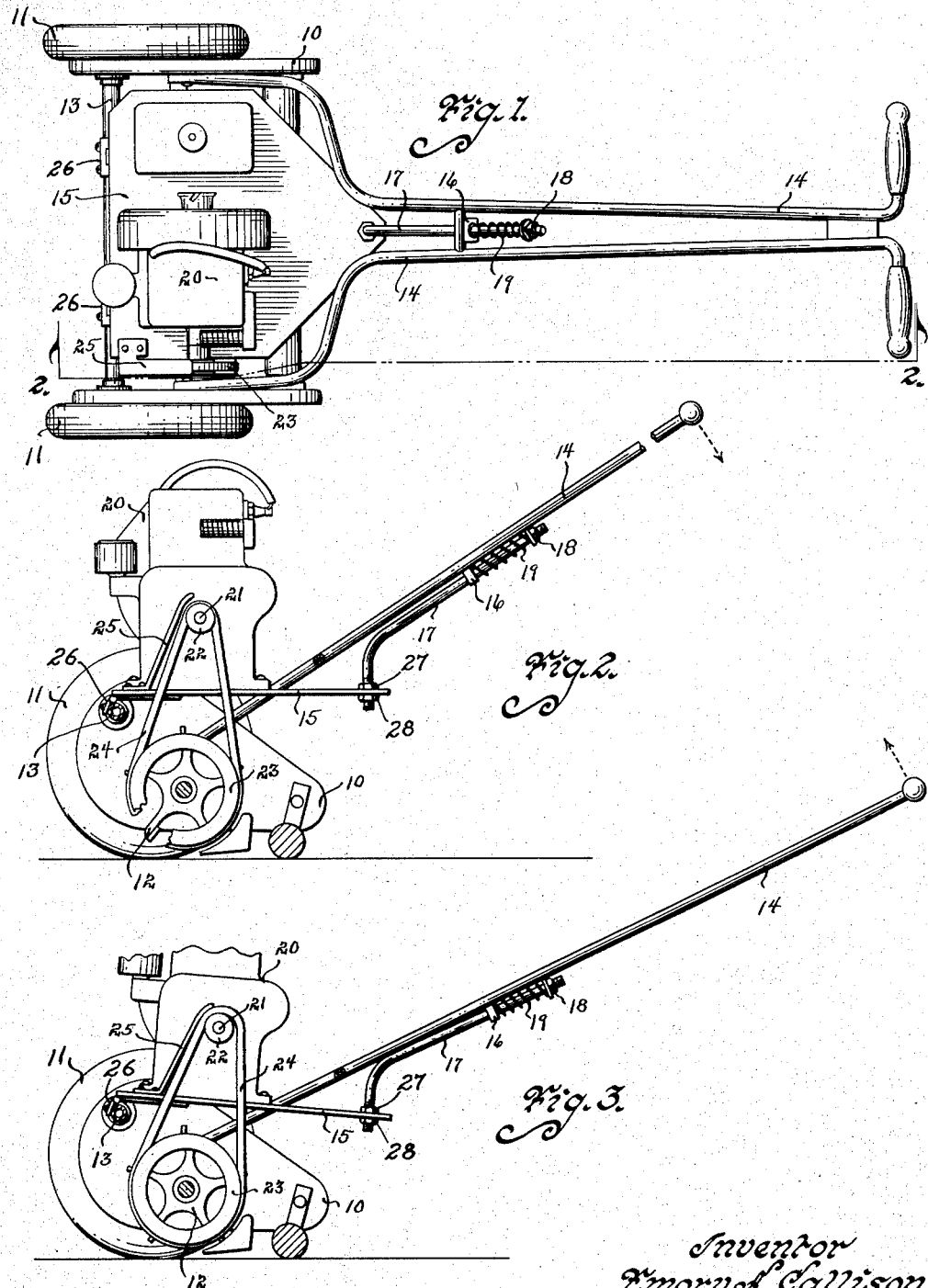

Patented Aug. 28, 1951

2,566,164

UNITED STATES PATENT OFFICE 2,566,164

MOTORIZED LAWN MOWER

Emory A. Callison, Chariton, Iowa

Application May 28, 1948, Serial No. 29,793

2 Claims. (Cl. 56—26)

The principal object of my invention is to provide a lawn mower of the motor driven type that is easily handled and under the complete control of the operator at all times.

More specifically the object of this invention is to provide a hinged platform for adjustably supporting the prime mover, whereby complicated mechanism such as conventional clutches, transmissions, chains, controls and like are either eliminated or simplified.

A further object of this invention is to provide a motorized lawn mower that may be stopped or started into motion merely by lowering or raising the guiding handle.

A still further object of my invention is to provide a motorized lawn mower that is refined in appearance, durable in use, and economical in manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top plan view of my lawn mower ready for use.

Fig. 2 is a side sectional view of the device taken on line 2—2 of Fig. 1, and with the handle raised for causing the mower to move forwardly.

Fig. 3 is a view similar to Fig. 2, but with the guiding handle lowered for disconnecting the prime mover with the reel and traction wheels of the lawn mower.

There are many type of mechanized lawn mowers on the market. In most instances however they are very complicated and employ clutches, chains and controls leading to the end of the mower handle, which are not only difficult but unnatural to manipulate. Usually much power is lost in the transmission phase and the smaller internal combustion engines commonly used, do therefore have hardly enough horsepower to turn the reel, let alone the traction wheels. I have overcome such objections by mounting the engine on a hinged supporting base plate and which I will now describe in detail.

I have used the numeral 10 to designate an ordinary lawn mower having the usual two traction wheels 11, the reel 12 geared thereto, a forward horizontal brace bar 13, and a guide push and pull handle 14 capable of limited up and down swinging movement. It is to such a lawn mower that I install my motorizing equipment.

The numeral 15 designates a plate platform having its forward marginal edge hinged onto the bar 13, by any suitable means such as the hinge plates 26 as illustrated. This supporting base extends rearwardly over the reel portion of the mower and between the fork of the handle 14. The rear end of the plate is supported by being flexibly secured to the center length portion of the handle which I will now describe. The numeral 16 designates a bracket secured to the center length portion of the handle. The numeral 17 designates a rod having its front end secured to the center back portion of the plate. This rod extends first upwardly and rearwardly to the handle and then parallel with the length of the guide handle, as shown in Fig. 3. The rear end portion of this rod extends loosely through a hole in the bracket 16. The numeral 18 designates a nut threaded on the extreme free end portion of the rod. The numeral 19 designates a coil spring on the rod having one end operatively engaging the nut 18 and its other end engaging the bracket 16. By this arrangement the rear end of the plate will be yieldingly secured to the handle and the handle may be manually swung upwardly or downwardly with comparative ease. The ease of this action may be adjusted by loosening or tightening the nut 18. Obviously, when the rear end of the handle is raised, the rear end of the plate will be raised, and when the handle is lowered or permitted to lower to its normal position, as shown in Fig. 3, the rear end of the plate will accordingly be lowered. In connection with the ease of operation of the handle, it is pointed out that the nuts 27 and 28 which secure the lower or forwardly end of the rod 17 to the base plate platform member 15 can be adjusted upwardly or downwardly to raise or lower the height of the handle 14 in accordance with the desired convenience of the operator and also for the purpose of adjusting the normal position of the plate 15 to compensate for a slack or tight belt. The spring 19 serves the purpose or releasing the weight from the motor and base platform on the handle and increases considerably the ease of operating the mower. Without this spring 19 or its equivalent, a good deal of weight would rest on the handle and consequently, would require considerable effort to raise the motor high enough to properly tighten the belt about the pulleys. Normally, the rod 17 and spring 19 will relieve the handle of considerable weight which is transmitted through the forward part of the handle to the rear of the mower frame. However, by tightening the nut 18 to compress the spring 19, the handle will be raised and any weight thereon will be further reduced as described. By this arrangement the spring furnishes the power to relieve the handle of the weight of the motor and base plate and also to transmit that weight through the handle to the rear of the mower frame and prevent it from rising when the handle is elevated. Actually, this spring 19 can be compressed sufficiently to a point where the belt is always in driving contact with the pulley wheels and will remain there unless lowered by a slight manual pressure. This adjustable feature of the rod and spring as described is a novel arrangement designed to compensate for varying conditions of the belt such as excessive slack, dampness, or the like. Upon the plate I mount my prime mover, which may be an electric motor or an internal combustion engine 20, as shown in the drawings. Regardless of the type of engine, they all have a drive shaft 21. On this shaft I secure a relatively small V-belt pulley wheel 22. On the shaft of the reel and adjacent one of the traction wheels, I mount a comparatively large V-belt pulley wheel 33. These two pulley wheels are in the same vertical plane and the engine is set back from the hinged front end of the plate. The numeral 24 designates an endless V-belt embracing the two pulley wheels. The numeral 25 designates a belt engaging bracket on the base plate and adjacent the upper portion of the belt.

The operation of my mower is as follows: When the handle is raised, as shown in Fig. 2, the rear end of the plate will be elevated, thereby slightly raising the engine and tightening the belt. With the engine running the pulley wheel 22 will drive the belt, which will drive the pulley wheel 23, and thence the reel and traction wheels of the mower. By merely lowering the handle or permitting it to drop, the rear end of the plate will accordingly be lowered, thereby decreasing the distance between the two pulley wheels. This loosening of the belt and its contact with the bracket 25 will clear it of frictional contact with the pulley wheel 21, and the motor will be no longer operatively connected to the reel and traction wheels of the mower. Obviously, with the lowering of the handle the reel and traction wheels will stop their forward rotary motion and the mower will stop. This control is safe and natural. Merely by taking the hands from the mower handle, the forward movement of the mower will stop. Also if the mower is traveling too fast for the operator, the handle will automatically be lowered and the machine will either slow down or stop entirely. Furthermore, in mowing it is continuously necessary to be pulling the mower backwardly to start a new swath or like. By merely holding onto the handle or by the act of pulling the machine backwardly the handle will drop thereby automatically performing the necessary act of disengaging the engine from the reel and traction wheels. The adjustment of the nut 18 will not only adjust the ease of manually swinging the handle upward or downward, but slightly regulate the tension of the belt of the pulley wheels. To start the forward movement of the mower it is merely necessary to lift the mower handle.

While I have described the control of the device by the mower handle, if desired, the handle may be independent thereof, and a separate lever extended from the hinged platform to the grip portion of the handle.

Some changes may be made in the contruction and arrangement of my motorized lawn mower without departing from the real spirit and purpose of my invention, and it is my intention to cover by my claims, any modified forms of structure or use of mechanical equivalents which may be reasonably included within their scope.

I claim:

1. In combination with a lawn mower having a frame, a reel, a movable handle and traction wheels, a motor mount and control comprising, a base member hinged to said frame at one end, a prime mover on said base, a pulley wheel connected to said prime mover a pulley wheel connected to said reel, a belt embracing both of said wheelh so that normally said belt is embracing but not in driving frictional engagement with both of said pulley wheels, an apertured bracket member secured to the center length portion of said handle, a rod member having its front end secured to the center back portion of said base member and extending therefrom first upwardly and rearwardly to said handle and then parallel with the length of said handle with the rear portion of said rod passing loosely through the aperture in said bracket member, a nut threaded on the extreme free end of said rod, a yielding means on said rod member having one end operatively engaging said nut and the other end engaging said bracket member.

2. In combination with a lawn mower having a frame, a reel, a movable handle and traction wheels, a motor mount and control comprising, a base member hinged to said frame at one end, a prime mover on said base, a pulley wheel connected to said prime mover, a pulley wheel connected to said reel, a belt embracing both of said wheels so that normally said belt is embracing but not in driving frictional engagement with both of said pulley wheels, an apertured bracket member secured to the center length portion of said handle, a rod member having its front end adjustably secured to the center back portion of said base member and extending therefrom first upwardly and rearwardly to said handle and then parallel with the length of said handle with the rear portion of said rod passing loosely through the aperture in said bracket member; said rod member capable of being adjusted to vary the normal height of said base member and said handle, a nut threaded on the extreme free end of said rod, an adjustable yielding means on said rod member having one end operatively engaging said nut and the other end engaging said bracket member and capable of being adjusted to lessen any weight on said handle from said prime mover and said base member and to direct the force thereof to the rearwardly portion of said frame whereby the upwardly movement of said handle will not cause an upwardly movement of the rearwardly portion of said frame.

EMORY A. CALLISON.

REFERENCES CITED

The following references are of record in the file of this patent:

UNITED STATES PATENTS

| Number | Name | Date |
| --- | --- | --- |
| 2,022,648 | Straube | May 28, 1935 |
| 2,082,600 | Squires et al. | June 1, 1937 |
| 2,151,659 | Funk | Mar. 21, 1939 |
| 2,256 583 | Squires | Sept. 23, 1941 |
| 2,468,839 | Rodesci | May 3, 1949 |